(12) United States Patent
Feng et al.

(10) Patent No.: US 9,961,002 B2
(45) Date of Patent: May 1, 2018

(54) PACKETUSHER: ACCELERATING COMPUTER-INTENSIVE PACKET PROCESSING

(71) Applicant: Macau University of Science and Technology, Macau (MO)

(72) Inventors: Li Feng, Macau (MO); Liang Zhou, Beijing (CN); Zhijun Xu, Beijing (CN); Yujun Zhang, Beijing (CN)

(73) Assignee: Macau University of Science and Technology, Macau, MO (US)

( * ) Notice: Subject to any disclaimer, the term of this patent is extended or adjusted under 35 U.S.C. 154(b) by 176 days.

(21) Appl. No.: 14/972,062

(22) Filed: Dec. 16, 2015

(65) Prior Publication Data

US 2017/0163538 A1 Jun. 8, 2017

Related U.S. Application Data

(60) Provisional application No. 62/262,344, filed on Dec. 2, 2015.

(51) Int. Cl.
*H04L 12/803* (2013.01)
*H04L 12/707* (2013.01)
(Continued)

(52) U.S. Cl.
CPC ............ *H04L 47/125* (2013.01); *H04L 45/24* (2013.01); *H04L 47/2483* (2013.01); *H04L 69/22* (2013.01)

(58) Field of Classification Search
CPC ... H04L 45/24; H04L 47/125; H04L 47/2483; H04L 69/22
(Continued)

(56) References Cited

U.S. PATENT DOCUMENTS

2011/0175825 A1* 7/2011 Chen .................. G06F 3/03547
345/173
2012/0290696 A1* 11/2012 Wu .................. G06F 17/30197
709/223

(Continued)

OTHER PUBLICATIONS

Han et al. (PacketShader: A GPU-Accelerated Software Router, Sep. 3, 2010), 12 pages.*

(Continued)

*Primary Examiner* — Jae Y Lee
*Assistant Examiner* — Jean F Voltaire
(74) *Attorney, Agent, or Firm* — Spruson & Ferguson (Hong Kong) Limited

(57) ABSTRACT

Compute-intensive packet processing (CIPP) in a computer system comprising a programmable computing platform is accelerated by using a packet I/O engine, implemented on the platform, to perform packet I/O functions, where the packet I/O engine is configured to achieve direct access to a network interface card (NIC) from a user application. For a Linux-based computer system, standard I/O mechanisms of Linux are bypassed and only the packet I/O engine is used in performing the I/O functions. Furthermore, the computer system is configured to: process a batch of packets, instead of packet by packet, in every function call; and when moving a packet between a buffer of an individual user application and a queue of the packet I/O engine, copy a packet descriptor of the packet instead the entire packet. In addition, workflows across different working threads are balanced and parallelism is exploited to fully utilize resources of the platform.

20 Claims, 16 Drawing Sheets

(51) Int. Cl.
  *H04L 12/851* (2013.01)
  *H04L 29/06* (2006.01)
(58) Field of Classification Search
  USPC .......................................................... 370/235
  See application file for complete search history.

(56) References Cited

U.S. PATENT DOCUMENTS

2015/0244804 A1\* 8/2015 Warfield ............. H04L 47/6295
                                                  709/219
2016/0044695 A1\* 2/2016 Gunner ................... H04L 49/90
                                                  370/336

OTHER PUBLICATIONS

Han et al. (PacketShader: A GPU-Accelerated Software Router, dated Sep. 3, 2010).\*
S. Han, K. Jang, K.S. Park, and S. Moon. Packetshader: a gpu-accelerated software router. In ACM SIGCOMM Computer Communication Review, 40(4):195-206, 2010.
Martin Casado, Teemu Koponen, Scott Shenker, Amin Tootoonchian. Fabric: a retrospective on evolving SDN. In the first workshop on Hot topics in software defined networks, 2012.
Network Functions Virtualization—Introductory White Paper. In ETSI, 2012.
G. Adam Covington, Glen Gibb, John W. Lockwood, Nick Mckeown. A Packet Generator on the NetFPGA Platform. In 17th IEEE Symposium on Field Programmable Custom Computing Machines, pp. 235-238, 2009.
Gianni Antichi, Andrea Di Pietro, Domenico Ficara, Stefano Giordano, Gregorio Procissi, Fabio Vitucci. Design of a High Performance Traffic Generator on Network Processor. In 11th EUROMICRO Conference on Digital System Design Architectures, Methods and Tools, pp. 235-238, 2008.
Luigi Rizzo. Netmap: a novel framework for fast packet I/O. In 2012 USENIX conference on Annual Technical Conference, pp. 9-9, 2012.
Pongracz G. Removing Roadblocks from SDN: OpenFlow Software Switch Performance on Intel DPDK. In 2013 Second European Workshop on Software Defined Networks (EWSDN), 2013.
Moti N. Thadani and Yousef A. Khalidi. An Efficient Zero-Copy I/O Framework for UNIX. In Sun Microsystems, 1995.
Vishwanath, K. Venkatesh, and A. Vandat. Realistic and responsive network traffic generation. In conference on Applications, technologies, architectures, and protocols for computer communications, SIGCOMM 06, ACM, 2006.
L. Deri. Improving passive packet capture: beyond device polling. In Sane, 2004, Amsterdam.
J. Mogul, K. Ramarkishnan. Eliminating receive livelock in an interrupt-driven kernel. In ACM TOCS, 15(3):217-252, 1997. [STA1].
Luigi Rizzo, Marta Carbone, Gaetano Catalli. Transparent acceleration of software packet forwarding using netmap. In IEEE INFOCOM, 2012.
M. Dobrescu, N. Egi, K. Argyraki, B.-G. Chun, K. Fall, G. Iannaccone, A. Knies, M. Manesh, S. Ratnasamy. RouteBricks: exploiting parallelism to scale software routers. In SOSP, 2009.
S. Bradner, J. McQuaid. Benchmarking Methodology for Network Interconnect Devices. RFC2544, 1999.[STA2].
Ben Pfaff, Justin Pettit, Teemu Koponen, Keith Amidon, Martin Casado and Scott Shenkerz. Extending networking into the virtualization layer. In ACM SIGCOMM HotNets, 2009.
E. Kohler, R. Morris, B. Chen, J. Jannotti, and M.F. Kaashoek. The click modular router. In ACM Transactions on Computer Systems (TOCS), 18(3):263-297, 2000.
R. Bolla, R. Bruschi, M. Canini, and M. Repetto. A High Performance IP Traffic Generation Tool Based on the Intel IXP2400 Network Processor. In Distributed Cooperative Laboratories: Networking, Instrumentation, and Measurements, pp. 127-142, 2006.
N. Bonelli, A.D. Pietro, S. Giordano, and G. Procissi. Flexible High Performance Traffic Generation on Commodity Multi-Core Platforms. In TMA 2012 Workshop, Wien, AT, 2012.
Zhitao Wan. Many-Core Processor Based High Performance Traffic Multiplier. In 2011 Fifth Asia Modelling Symposium (AMS), 2011.

\* cited by examiner

PACKETUSHER: ACCELERATING COMPUTER-INTENSIVE PACKET PROCESSING

CROSS-REFERENCE TO RELATED APPLICATIONS

This application claims the benefit of U.S. Provisional Patent Application No. 62/262,344, filed on Dec. 2, 2015, which is incorporated by reference herein in its entirety.

BACKGROUND

Field of the Invention

The present invention generally relates to a method for performing compute-intensive packet processing (CIPP) in a computer system having a programmable computing platform. In particular, the present invention relates to such method with a goal of accelerating CIPP.

List of References

There follows a list of references that are occasionally cited in the specification. Each of the disclosures of these references is incorporated by reference herein in its entirety.

[1] S. Han, K. Jang, K. S. Park, and S. Moon. Packetshader: a gpu-accelerated software router. In ACM SIGCOMNI Computer Communication Review, 40(4): 195-206, 2010.

[2] Martin Casado, Teemu Koponen, Scott Shenker, Amin Tootoonchian. Fabric: a retrospective on evolving SDN. In the first workshop on Hot topics in software defined networks, 2012.

[3] Network Functions Virtualization—Introductory White Paper. In ETSI, 2012.

[4] G. Adam Covington, Glen Gibb, John W. Lockwood, Nick Mckeown. A Packet Generator on the NetFPGA Platform. In 17th IEEE Symposium on Field Programmable Custom Computing Machines, pp. 235-238, 2009.

[5] Gianni Antichi, Andrea Di Pietro, Domenico Ficara, Stefano Giordano, Gregorio Procissi, Fabio Vitucci. Design of a High Performance Traffic Generator on Network Processor. In 11th EUROMICRO Conference on Digital System Design Architectures, Methods and Tools, pp. 235-238, 2008.

[6] Luigi Rizzo. Netmap: a novel framework for fast packet I/O. In 2012 USENIX conference on Annual Technical Conference, pp. 9-9, 2012.

[7] Pongracz G. Removing Roadblocks from SDN: OpenFlow Software Switch Performance on Intel DPDK. In 2013 Second European Workshop on Software Defined Networks (EWSDN), 2013.

[8] Moti N. Thadani and Yousef A. Khalidi. An Efficient Zero-Copy I/O Framework for UNIX. In Sun Microsystems, 1995.

[9] Vishwanath, K. Venkatesh, and A. Vandat. Realistic and responsive network traffic generation. In conference on Applications, technologies, architectures, and protocols for computer communications, SIGCOMM 06, ACM, 2006.

[10] L. Deri. Improving passive packet capture: beyond device polling. In SANE, 2004, Amsterdam.

[11] J. Mogul, K. Ramarkishnan. Eliminating receive livelock in an interrupt-driven kernel. In ACM TOCS, 15(3):217-252, 1997.

[12] Luigi Rizzo, Marta Carbone, Gaetano Catalli. Transparent acceleration of software packet forwarding using netmap. In IEEE INFOCOM, 2012.

[13] M. Dobrescu, N. Egi, K. Argyraki, B.-G. Chun, K. Fall, G. Iannaccone, A. Knies, M. Manesh, S. Ratnasamy. RouteBricks: exploiting parallelism to scale software routers. In SOSP, 2009.

[14] S. Bradner, J. McQuaid. Benchmarking Methodology for Network Interconnect Devices. RFC2544, 1999.

[15] Ben Pfaff, Justin Pettit, Teemu Koponen, Keith Amidon, Martin Casado and Scott Shenkerz. Extending networking into the virtualization layer. In ACM SIGCOMM HotNets, 2009.

[16] E. Kohler, R. Morris, B. Chen, J. Jannotti, and M. F. Kaashoek. The click modular router. In ACM Transactions on Computer Systems (TOCS), 18(3):263-297, 2000.

[17] R. Bolla, R. Bruschi, M. Canini, and M. Repetto. A High Performance IP Traffic Generation Tool Based On The Intel IXP2400 Network Processor. In Distributed Cooperative Laboratories: Networking, Instrumentation, and Measurements, pp. 127-142, 2006.

[18] N. Bonelli, A. D. Pietro, S. Giordano, and G. Procissi. Flexible High Performance Traffic Generation on Commodity Multi-Core Platforms. In TMA 2012 Workshop, Wien, A T, 2012.

[19] Zhitao Wan. Many-Core Processor Based High Performance Traffic Multiplier. In 2011 Fifth Asia Modelling Symposium (AMS), 2011.

There follows a list of references occasionally cited in the specification and given as http links.

[20] DPDK web site. http://www.dpdk.org/.

[21] H3C S5024P-EI Gigabits Switch. http://www.h3c.com.cn/Products Technology/Products/Switches/Park switch/S5000/S5024P-EI/.

[22] Luigi Rizzo. netmap: fast and safe access to network adapters for user programs. In Tech. Report, Univ. di Pisa, June 2011, http://info.iet.unipi.it/luigi/netmap/, 2011.

[23] Linux NAPI web site. http://www.linuxfoundation.org/collaborate/workgroups/networking/napi.

[24] TestCenter web site. http://www.spirent.com/EthernetTesting/Software/TestCenter/.

[25] BreakingPoint web site. http://www.ixiacom.com/products/.

[26] Pktgen web site. http://www.linuxfoundation.org/collaborate/workgroups/networking/pktgen.

[27] Tcpreplay website. http://tcpreplay.synfin.net/trac/wiki/tcpreplay.

[28] PF RING website. http://www.ntop.org/products/pf ring/.

Description of Related Art

Packet processing is the core function of any network enabled applications. It divides the network applications into two categories: dumb header-driven applications and intelligent compute-intensive applications. A typical example of the former is packet forwarding systems (routers or switches) which only leverage header information to forward packets. It is easy to implement them on both dedicated-hardware (Network Processor or NetFPGA) and commodity PC with a line-rate throughput [4, 5]. On the other hand, intelligent compute-intensive applications process both the packet header and the payload of a packet with various complicated and time-consuming actions. Depending on specific payloads, workflows of the intelligent compute-intensive applications vary from one to another and usually require plenty of computing resources. Applications involving Deep Packet Inspection (DPI) systems, application-layer traffic generator and web servers all belong to this category.

A commodity PC is an ideal platform to deploy compute-intensive applications because of its flexibility and a rather low price. Such platform is inexpensive to operate (simple), easy to switch between vendors (vendor-neutral) and perfect to accommodate future software innovations (future-proof) [2]. In the industry, the principle of Network Function Virtualization (NFV) [3] suggests vendors to virtualize their network functions (firewalls, intrusion detection devices, etc.) on commodity PCs.

While a significant step was made forward in some respects, it was a step backwards in others [2]. Flexibility on commodity PCs is at the cost of discouraging low performance which is mainly restricted by packet I/O related overheads. An experiment result has shown that the sendto( ) system call of FreeB SD averagely takes 942 ns to move packets from applications to physical Network Interface Cards (NICs) [6]. RouteBricks (a software router) reports that about 66% of CPU cycles are spent on packet I/O [13].

To address the costly packet I/O issue, current research has proposed bypassing the Operating System (OS) environments and designing high-speed packet I/O frameworks (including Intel DPDK [20], Netmap [22] and PF RING [10]) to take direct control of hardware. Research in [12] demonstrates that replacing the standard packet I/O mechanism in a general-purpose OS with Netmap could transparently accelerate packet forwarding applications. However, such arrangement is not enough for compute-intensive applications. The packet I/O procedure for compute-intensive packet processing (i.e. CIPP) involves three stages: packet I/O between physical NICs and TX/RX queues; packet copy between TX/RX queues and application buffers; and the final header and payload processing. Existing packet I/O frameworks only accelerate the packet I/O between physical NICs and TX/RX queues. What is really needed is a scheme to remove packet I/O-related overheads along all the three stages.

Although high-speed packet I/O frameworks could not be used to accelerate CIPP directly, they provide a valuable foundation for the design of such scheme. Existing packet I/O frameworks have their drawbacks. PF_RING ZC (Zero Copy version) claims that it could achieve a line rate (14.881 Mpps) on a 10 Gbit/s link [28]. However, this version of PF_RING is not free for commercial companies or individuals. The open-source Netmap usually takes 90 CPU cycles to send or receive packets [6], but it may drop packets randomly.

There is a need in the art for a technique, a method or an arrangement for accelerating CIPP.

Other works related to CIPP are briefly described as follows. Current commercial high-performance application-layer traffic generators, including Breakingpoint Storm CTM [25] and TestCenter [24], both build their systems on dedicated physical equipment, and these products are extremely expensive for common customers. Some previous works designed high-performance traffic generators on commodity PCs. Research in [5, 17] proposed using a combination of Network Processors and commodity PCs. However, the generated traffic is not stateful, realistic and responsive, and the proposed technique is not configured to receive packets, the latter being the most challenging. As it is known, the kernel module of Linux pktgen [26] could also transmit packets in an acceptably high rate. Similarly, research in [4] proposed to utilize NetFPGA to generate or capture network traffic. This technique was reported to outperform the tool of TCP-replay [27]. However, the generated traffic from NetFPGA is also not stateful and responsive. Other works [18, 19] took advantage of parallelism in a current CPU and a NIC, but these works only emulated simple traffic and did not receive network traffic as well.

SUMMARY OF THE INVENTION

As used herein, Intel's Data Plane Development Kit is abbreviated as DPDK.

An aspect of the present invention is to provide a method for performing CIPP in a computer system comprising a programmable computing platform and one or more NICs. The platform has a plurality of resources and is used for performing packet I/O functions for plural threads generated by a plurality of user applications. The one or more NICs are for transmitting and receiving packets.

The method comprises implementing a packet I/O engine on the platform for performing the packet I/O functions, and using the packet I/O engine to perform the packet I/O functions for the user applications, wherein the packet I/O engine is configured to achieve direct NIC access from each of the user applications. Preferably, the method further comprises one or more of the following steps: configuring the computer system to process a batch of packets, instead of one packet by another packet, in every function call; configuring the computer system to, when moving a first packet between a buffer of an individual user application and a queue of the packet I/O engine, copy a packet descriptor of the first packet instead of an entirety of the first packet; and balancing workflows across different working threads and exploiting parallelism to fully utilize the resources.

Preferably, the packet I/O engine is implemented as follows. The platform is configured such that only one of the threads is permitted to initialize and configure the resources. Furthermore, the platform is set up with I/O-device queues each for buffering packets either transmitted to or received from an individual external I/O device. For a plurality of unsafe I/O-device queues determined to be multi-thread unsafe among the I/O-device queues, the platform is further set up with a plurality of multi-producer, multi-consumer software queues for buffering packets delivered between the plurality of the unsafe I/O-device queues and the plurality of user applications. The plurality of multi-producer, multi-consumer software queues is configured such that the unsafe I/O-device queues are collectively synchronized to maintain data consistency in packet delivery when the plural threads are present.

In case the computer system is Linux-based, preferably the computer system is configured to bypass standard I/O mechanisms of Linux and to only use the packet I/O engine in performing the I/O functions.

In one embodiment, the platform is Intel DPDK and the packet I/O engine is a DPDK Wrapper.

Other aspects of the present invention are disclosed as illustrated by the embodiments hereinafter.

BRIEF DESCRIPTION OF THE DRAWINGS

FIG. 5 is a graph plotting throughputs against different batch sizes when the cache option of DPDK is turned on.

DETAILED DESCRIPTION

As used herein in the specification and appended claims, "a programmable computing platform" is a computer instruction module executable by one or more computing processors and embodying a plurality of resources wherein the resources are configured to perform computing, controlling, I/O functions, or a combination thereof, and wherein some or all of the resources are reconfigurable according to one or more software codes externally loaded into the platform.

Although the present invention is exemplarily illustrated based on an example of (1) DPDK Wrapper developed on DPDK and (2) PacketUsher that utilizes DPDK Wrapper for providing direct NIC access, it is understood that the present invention is applicable to a general programmable computing platform and is not limited only to DPDK.

Open-source Intel DPDK can accomplish the task of packet I/O within less than 80 CPU cycles [20]. Many companies (Intel, 6WIND, Radisys, etc.) have already supported DPDK within their products. Based on DPDK, we propose PacketUsher that is specifically customized for reducing I/O overheads in compute-intensive packet processing. The present work of PacketUsher is important because PacketUsher can be widely used to improve the performance of compute-intensive applications on commodity PCs. The key results of the present work are as follows.

DPDK Wrapper: As the premise of PacketUsher, we first need a high-performance packet I/O engine to move packets between physical NICs and software TX/RX queues efficiently. This engine should have low coupling with user applications, multi-thread safe programming environment, simple packet I/O API, and high-speed packet I/O performance. Based on the libraries and drivers of DPDK, we have designed and implemented an efficient packet I/O engine named DPDK Wrapper that is equipped with the above-mentioned four properties. Our study manifests that RFC 2544 benchmark [14] over our DPDK Wrapper can achieve the same testing results as expensive dedicated commercial device. Details of DPDK Wrapper are also disclosed in a co-pending U.S. Patent Application Ser. No. 62/261,879, the disclosure of which is incorporated by reference herein in its entirety.

Figure 1:
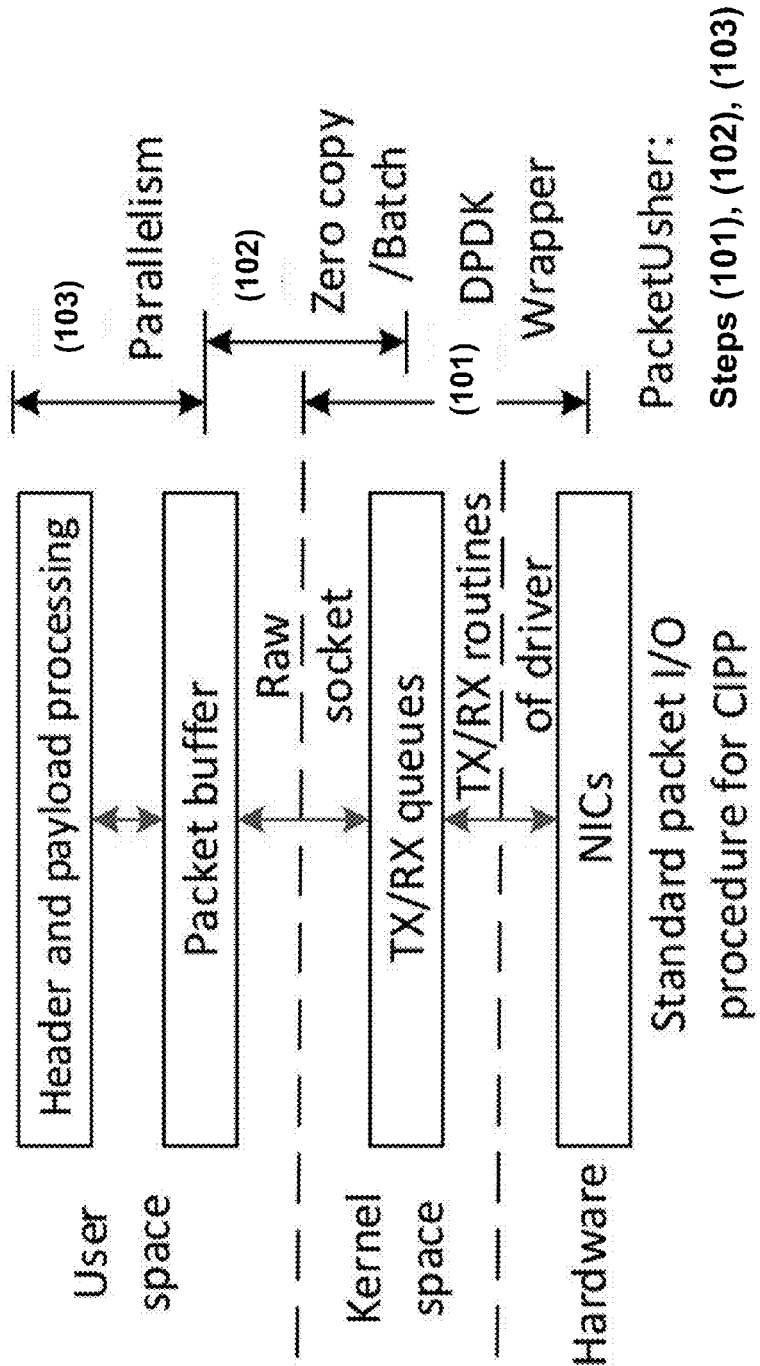
FIG. 1 depicts an architecture of PacketUsher in accordance with an exemplary embodiment of the present invention.

PacketUsher: Using DPDK Wrapper as the underlying packet I/O engine, we also develop PacketUsher that utilizes the strategies of zero copy [8], batch processing and parallelism to accelerate CIPP through reducing I/O overheads. As shown in FIG. 1, PacketUsher has three steps: replacing the raw packet I/O API with DPDK Wrapper (101), which is more efficient than this API; utilizing zero copy and batch processing to reduce memory copy overheads (102); and utilizing parallelism to balance packet processing workloads across multiple CPU cores (103), thus mitigating the problem of packet loss on RX queues.

Commercial System Evaluation: As one case study of PacketUsher, we have designed and implemented an application-layer traffic generator. Similar to the one presented in [9], the application-layer traffic generator as designed and implemented can emulate both clients and servers to generate a mixture of application-layer flows so as to be able to test the performance of network appliances. Each flow contains a series of user behaviors such as making an URL request, sending a username and a password, authenticating a user, etc. In the present work, we use the number of Flows generated Per Second (FPS) to evaluate the performance of the traffic generator developed by us. It was tested that its FPS value on standard Linux system was 35,000 flow/s. PacketUsher noticeably improved its FPS value to 148,000 flow/s, which is more than 4 times when compared to that implemented on standard Linux. By comparison, the performance over PacketUsher is about 3 times of that over existing I/O frameworks (Netmap and PF_RING) on the same application.

A. Background Knowledge

A.1 Compute Intensive Packet Processing

As mentioned above, CIPP is required to extract both header and payload information from packets, and then conduct complicated and time-consuming actions on the header and the payload. The typical examples of compute-intensive applications are DPI systems and application-layer traffic generator. DPI systems are usually used by Internet service providers (ISPs) to gain finer-grained traffic control and content censorship. These systems identify and classify packets based on accumulated information of packet flows, and then undertake tasks such as attacks detection, QoS control, etc. For an application-layer traffic generator, it is required to maintain the state of flows and to generate responsive traffic.

Figure 2:
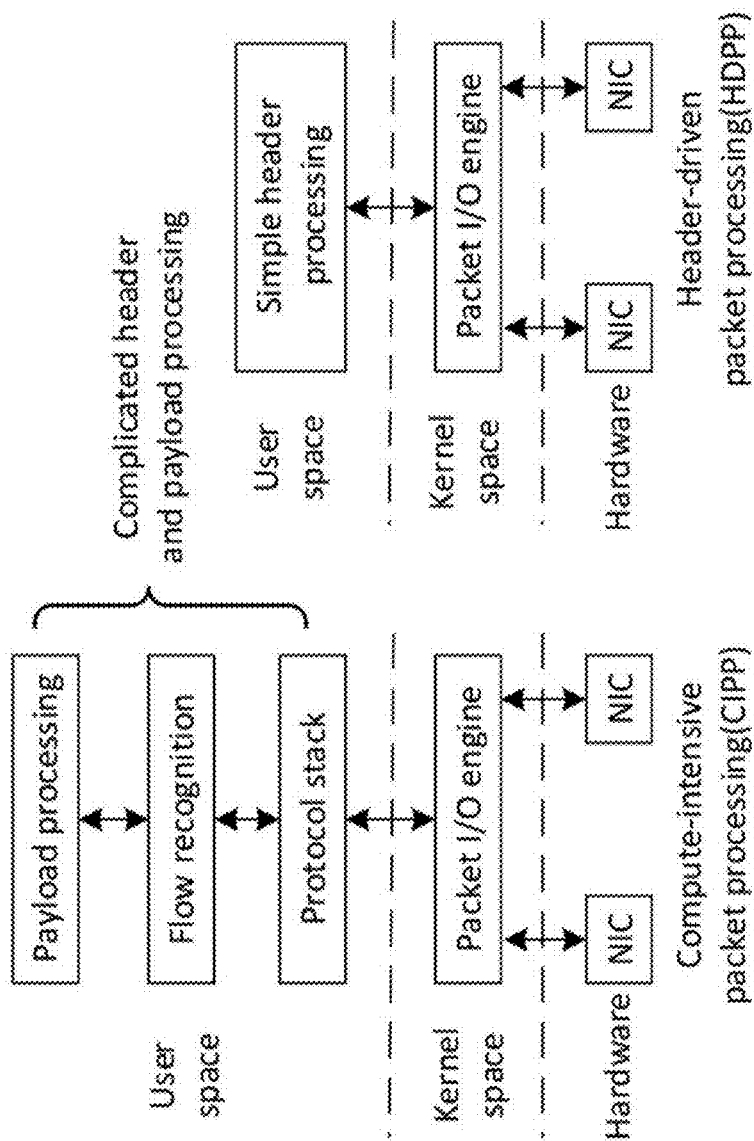
FIG. 2 provides a comparison between CIPP and header-driven packet processing (HDPP).

FIG. 2 depicts the general packet processing procedure of CIPP. Being different from header-driven packet processing (i.e. HDPP), CIPP's complicated header and payload processing involves three stages. 1) Packet headers are analyzed in protocol stack. 2) Packets are classified into specific flows based on header information. 3) Payload information is processed by various control tasks.

A.2 Overheads of Standard Packet I/O Mechanism

A standard packet I/O mechanism in a general-purpose OS is interrupt-driven. The packet I/O procedure for received packets has three steps. 1) The NIC interrupts CPU to notify an arrival of packets, and then receives a routine of drivers fetches these packets from the NIC. 2) The I/O subsystem of the OS allocates packet buffers and metadata in kernel space to store the received packets. 3) User-space applications fetch packets from the aforementioned buffers with a cost of memory copy and kernel-user mode switching. Such I/O procedure has three overheads: interrupt handling, buffer allocation and memory copy.

Interrupt Handling: In case of a high frame rate, an interrupt-driven mechanism may confront the problem of receive livelock [11]. One way to mitigate this problem is to process a batch of packets per interrupt. Previous works [1, 12, 13] all utilize this method to reduce overheads of interrupt handling. However, some received packets may be dropped if the OS fails to handle interrupt requests timely. Another method is to replace interrupt-driven mechanism with polling and to periodically check the arrival of packets on NICs. The drawback of such method is that it is required to use custom drivers instead of standard ones. In a Linux system, the NAPI [23] module uses interrupts to notify an arrival of packets and then uses polling to receive the batch of packets.

Buffer Allocation: Buffer allocation is another time-consuming action. Frequent allocating buffers for transmitted or received packets costs much system resources. Previous works (including DPDK, Netmap, PF_RING and PacketShader [1]) all pre-allocate pool of fix-size packet buffers to accelerate the procedure of buffer allocation.

Memory Copy: Memory copy is the last overhead in the procedure of moving packets between physical NICs and user applications. For the reason of abstraction and deferred processing [6], whole packets are usually copied in system calls. To reduce this overhead, shared memory region is a good choice.

Most existing proposals for fast packet I/O work in kernel space and requires radical change of I/O mechanism. For example, standard NIC drivers are replaced with corresponding poll mode drivers, and a shared memory pool is usually allocated and manipulated in a kernel space. These proposals are not safe and convenient to developers. Programming errors may result in serious corruptions to the OS.

A.3 DPDK

Intel DPDK is a set of open-source libraries and drivers aiming at high-speed packet I/O on commodity PCs. Currently, it has already supported many PCI NICs and para-virtualization interfaces including e1000 family, ixgbe, virtio-net and etc. DPDK can be applied to many network applications such as OpenFlow switches [7], load balancers and traffic QoS controllers, to name a few.

DPDK leverages many effective methods to reduce overheads in packet I/O. For interrupt handling, it utilizes polling to avoid the problem of receive livelock. For memory copy, a batch of packets is processed in system calls to reduce per-packet amortized costs. In DPDK, memory alignment, Hugepage and the memory pool are all used to reduce overheads of buffer allocation. Paddings are added between objects in physical memory so that all channels are equally loaded. Additionally, Hugepage instead of the standard 4K page size decreases the occurrence of TLB misses. Finally, a pre-allocated memory pool over the above-mentioned Hugepage can speed up buffer allocation.

Using the above methods, DPDK usually sends or receives packets within 80 CPU cycles, and it is easy to achieve line-rate packet I/O on 1 . . . 10 Gbit/s links. The highest frame rate reported for packet processing functions is 160 Mpps [20].

B. DPDK Wrapper

DPDK is an abstraction layer of the underlying system resource. It provides mechanisms and libraries to remove packet I/O related overheads. Programmers can leverage the APIs of DPDK to manipulate hardware and system resource directly. In order to accelerate CIPP, we first need to design a high-performance, safe packet I/O engine. Such packet I/O engine can move packets from NICs to user applications quickly. However, it is not an easy task for common users to design such an efficient packet I/O engine based on DPDK. There are four obstacles for them:

Complicated Mechanism. DPDK takes direct control of hardware and system resources. Programmers should be familiar with the packet I/O mechanisms in DPDK; otherwise writing correct program is a tough work.

Multi-Thread Unsafe. Many system resources in DPDK (Hugepage, TX/RX queues of Ethernet devices, etc.) are not multi-thread safe. Programmers should carefully write their codes to avoid system crash.

Difficulty in Achieving High Performance. Common users usually lack experience in utilizing libraries of DPDK to achieve high performance. They also do not know how to properly configure parameters.

Different I/O APIs. Because DPDK operates directly on underlying system resources, its packet I/O APIs are not the same as the ones in standard Linux. User applications usually have high coupling with libraries of DPDK.

The above-mentioned four problems of DPDK motivate us to design a simple, safe, low-coupling and high-performance packet I/O engine named DPDK Wrapper. Common users just need to run DPDK Wrapper and replace their packet I/O APIs with our similar ones to enjoy high-performance packet I/O. Based on DPDK Wrapper, we design PacketUsher to remove packet I/O-related overheads along all three stages in CIPP.

B.1 Architecture of DPDK Wrapper

Figure 3:
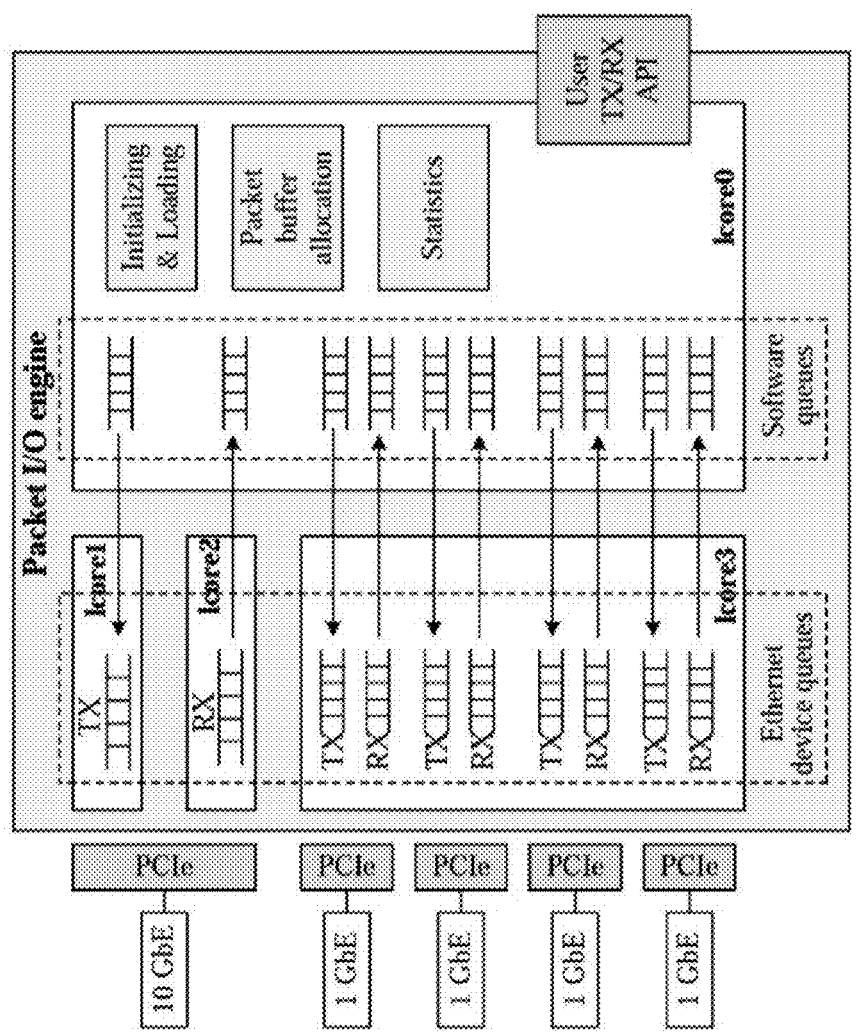
FIG. 3 depicts a simplified architecture of DPDK Wrapper.

Some resources and functions in DPDK are not multi-thread safe. For example, it may result in segment fault or network subsystem crash when more-than-one threads call the TX/RX functions of Ethernet device queue. The reason is that these multi-thread unsafe functions may cause data inconsistency (wrong descriptor value) in drivers. In order to provide a safer packet I/O environment for applications, only one thread in DPDK Wrapper has the privilege to initialize and configure system resources. Additionally, we add a layer of multi-producer, multi-consumer software queues between unsafe Ethernet device queues and user applications. FIG. 3 depicts a simplified architecture of DPDK Wrapper in the case of having four 1G NICs and one 10G NICs. In such architecture, lcore0 responds to the request of packet I/O from applications, and executes dequeue or enqueue actions on corresponding software queues. It also continuously moves packets between Ethernet device queues and software queues.

In DPDK Wrapper, both 1G and 10G NICs have only one pair of TX/RX device queues, and such design avoids the problem of synchronization between multiple queues. For 1G NICs, one CPU core (lcore3) could support four such NICs to undertake line rate (1.488 Mpps) packet I/O. For 10G NICs, DPDK Wrapper needs two separate CPU cores (lcore1 and lcore2) to achieve line-rate (14.881 Mpps) packet transmission and reception, respectively. The line-rate throughput of DPDK Wrapper demonstrates that added software queues do not bring performance penalty.

Finally, similar I/O APIs make application migration easier. All the details of DPDK are confined in DPDK Wrapper, and similar I/O APIs bring low coupling between user applications and underlying packet I/O engine.

B.2 Configure DPDK Wrapper with Optimal Parameters

For programmers who want to leverage the libraries of DPDK to build a high-performance packet I/O engine, it is necessary to configure these libraries with appropriate parameters. These parameters include cache option in memory pool, packet batch size, TX/RX queue size of Ethernet devices, size of memory pool and TX/RX Prefetch, Host, Write-back threshold values. In order to quantify their influence on packet I/O performance, we implement a simple program that repeatedly transmits and receives packets via the packet I/O API of DPDK Wrapper. For different configurations, we measure the TX and RX throughputs of DPDK Wrapper. In the present work, all experiments were conducted on the system equipped with Intel Xeon E5-2620 2.0 GHz CPU and 1333 MHz 8G memory. The Ethernet interfaces were eight Intel 1350 GbE NICs and two Intel 82599EB 10 GbE NICs. The obtained experimental results show that the cache option in memory pool and the packet batch size significantly affect the packet I/O throughput, whereas other parameters have little impact on the throughput. In DPDK Wrapper, we configure the above two parameters with optimal values.

Figure 4:
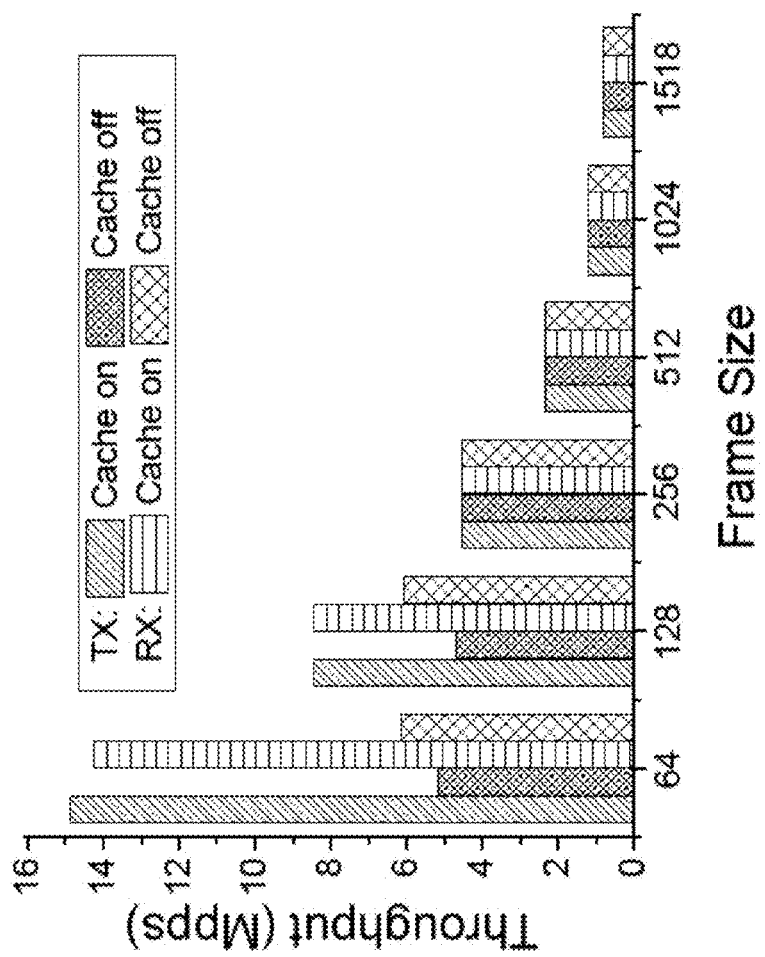
FIG. 4 a plot showing experimental results of throughputs against different frame sizes with and without a cache (batch size=16).

The first parameter is the cache option in memory pool. The cost of multiple cores accessing the ring of free buffers (with locks) in memory pool is high. Programmers can configure memory pool to maintain a per-core buffer cache at creation time. Allocating buffers from per-core cache and doing bulk requests to a ring of free buffers can reduce lock overheads, thereby gaining better performance. As illustrated in FIG. 4, the cache option in memory pool has notable influence on both TX and RX throughputs of DPDK Wrapper for small frame sizes. For example, the TX throughput on a 10 Gbit/s link with cache off (5.168 Mpps for 64-byte packets) is about 34.7% of the one with cache on (14.881 Mpps for 64-byte packets). In the case of cache on, the TX throughput (14.881 Mpps for 64-byte packets) is the line rate on a 10 Gbit/s link, and the RX throughput (14.255 Mpps for 64-byte packets) is close to the line rate. In DPDK Wrapper, we turn the cache option on.

Figure 5:
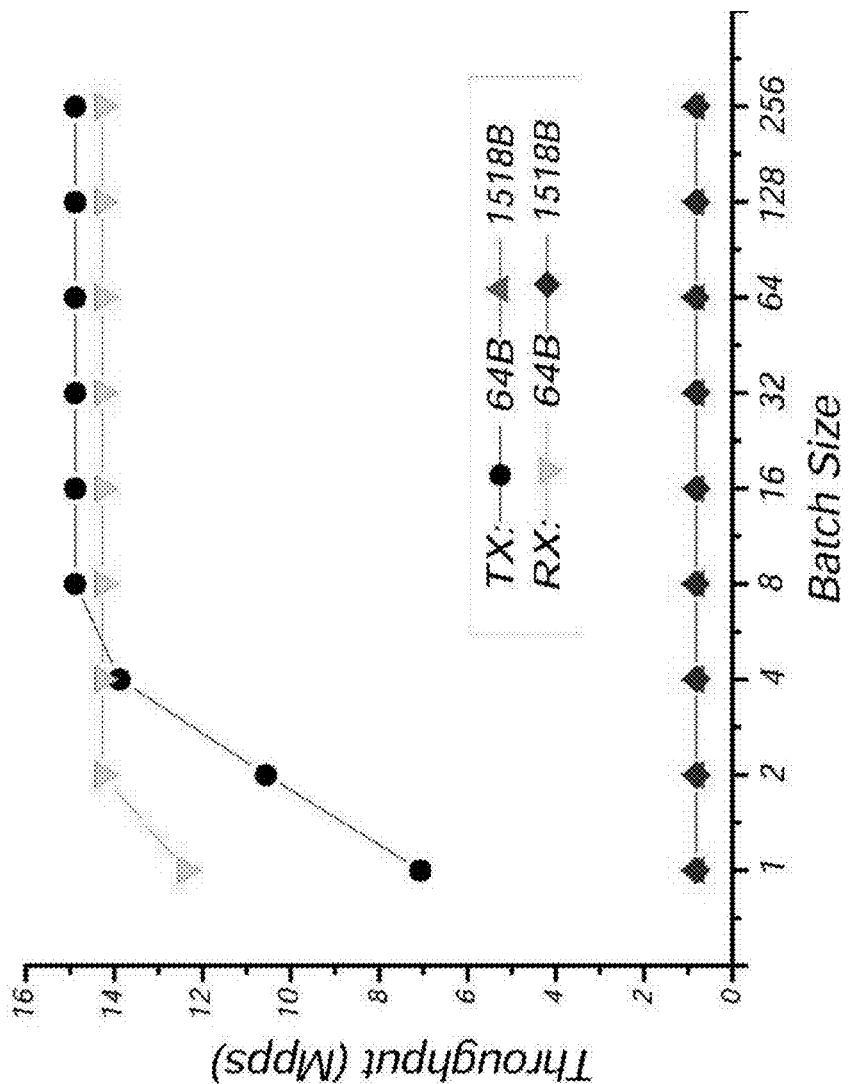

The second parameter is the packet batch size. In DPDK, enqueue and dequeue operations process a batch of packets per function call to reduce the amortized costs of each packet. FIG. 5 shows the TX and RX throughputs of DPDK Wrapper for different batch sizes. For 1518-byte packets, it is seen that both TX and RX throughputs (0.813 Mpps) are the line rate on a 10 Gbit/s link. For 64-byte packets, both TX and RX throughputs are improved when the batch size increases. While the TX throughput in packet-by-packet approach (with a batch size of 1) is 7.064 Mpps, the TX throughput (14.881 Mpps) reaches the line rate with a batch size of 16 and the RX throughput (14.255 Mpps) is close to the line rate as well. In DPDK Wrapper, we set the packet batch size to 16.

C. PacketUsher

PacketUsher improves the performance of compute-intensive network applications through removing packet I/O related overheads. It involves three steps: using DPDK Wrapper as the underlying packet I/O engine; utilizing batch processing and zero copy to reduce memory copy; and utilizing parallelism to accelerate headers and payload processing and thus mitigating packet loss on RX queues.

C.1 Using DPDK Wrapper as Underlying Packet I/O Engine

For compute-intensive applications deployed on commodity PC, performance bottlenecks mainly come from the packet I/O mechanisms. The procedure of moving packets between physical NICs and TX/RX queues is costly. As mentioned in Section A, packet I/O overheads of this procedure contain interrupt handling, buffer allocation and memory copy. In order to avoid these I/O overheads, we propose to bypass the standard I/O mechanisms of Linux system, and to use DPDK Wrapper as the underlying packet I/O engine. The packet I/O APIs of DPDK Wrapper are similar to the ones in Linux. Therefore, programming effort of transferring user applications to DPDK Wrapper is little.

Figure 6:
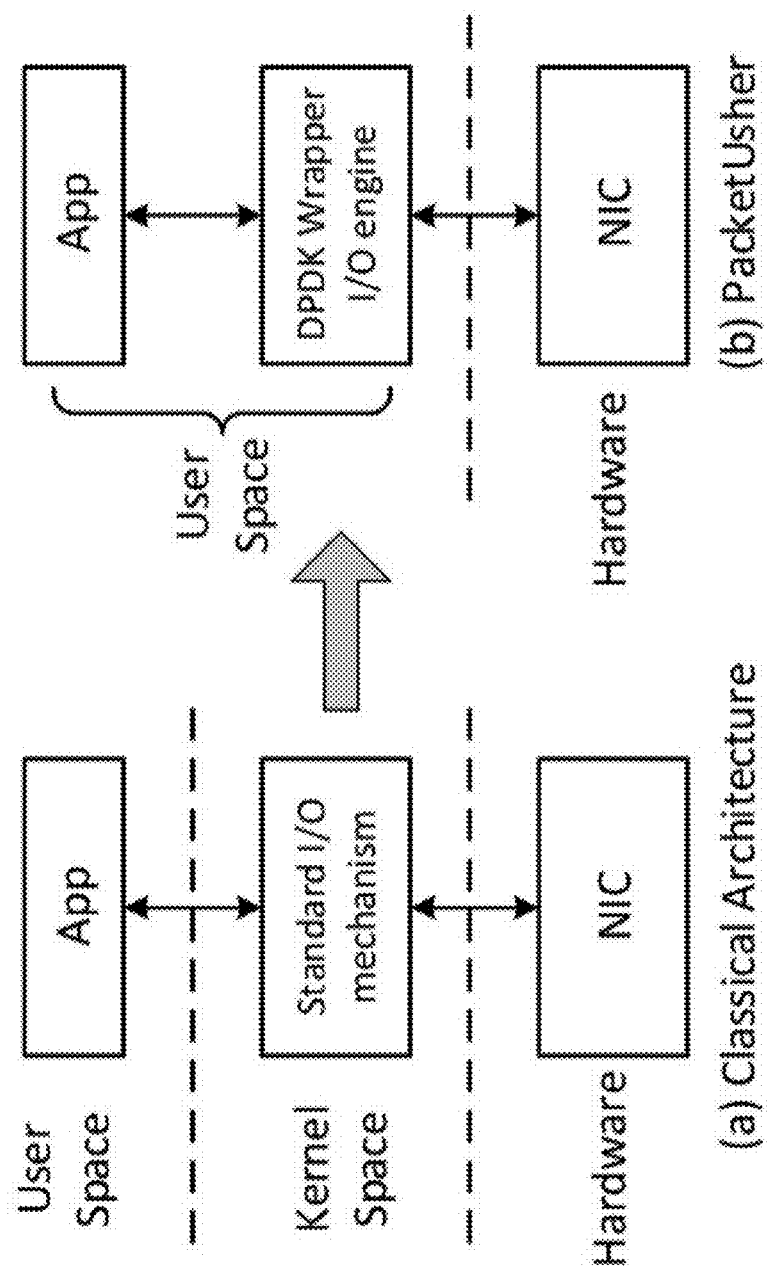
FIG. 6 illustrates how PacketUsher replaces costly kernel-space standard I/O with efficient user-space DPDK Wrapper.

FIG. 6(a) describes the classical architecture of packet I/O on Linux system, in which the standard I/O mechanism works in kernel-space and applications work in user-space. In this architecture, packets have to be copied between user-space application buffers and kernel-space TX/RX queues, thus suffering the overhead of kernel-user mode switching. In PacketUsher, we utilize UIO mechanism to achieve direct NIC access, which enables our DPDK Wrapper to work in the user space as well. FIG. 6(b) depicts the simplified architecture of PacketUsher in which both user applications and DPDK Wrapper work in user space. Such design reduces the overhead of kernel-user mode switching as well as I/O overheads between physical NICs and TX/RX queues.

C.2 Reduce Overhead of Memory Copy

After using DPDK Wrapper as the underlying packet I/O engine, packets are relayed between physical NICs and TX/RX queues efficiently. When user applications periodically fetch packets from RX queues in the case of receiving data, research in [1, 13] reported that this procedure is costly and recommend batch processing to obtain better performance. In PacketUsher, we process a batch of packets in every function call, thereby reducing a per-packet amortized cost. The experimental results in Section D demonstrate that this strategy can bring noticeable performance improvement.

Moving packets between TX/RX queues and application buffers requires at least one memory copy. The incentive of copying entire packets in function calls is for better abstraction [1], but such flexibility is at the cost of performance degradation at runtime [6]. Zero copy is an effective method to reduce the overhead of memory copy, which just copies packet descriptors instead of the entire packets.

Research in [1] claims that copy operations have little impact on performance in the case of packet forwarding, and thus zero copy would not bring noticeable performance improvement. However, our experimental results in Section D show that zero copy brings remarkable performance improvement for CIPP. The payload processing of compute-intensive applications is usually complicated and time-consuming. Packet loss could be observed on RX queues in the circumstance of high frame rate, which is caused by a low packet fetching speed from RX queues. Zero copy significantly speeds up the procedure of moving packets between TX/RX queues and application buffers, thereby improving the performance.

Figure 7:
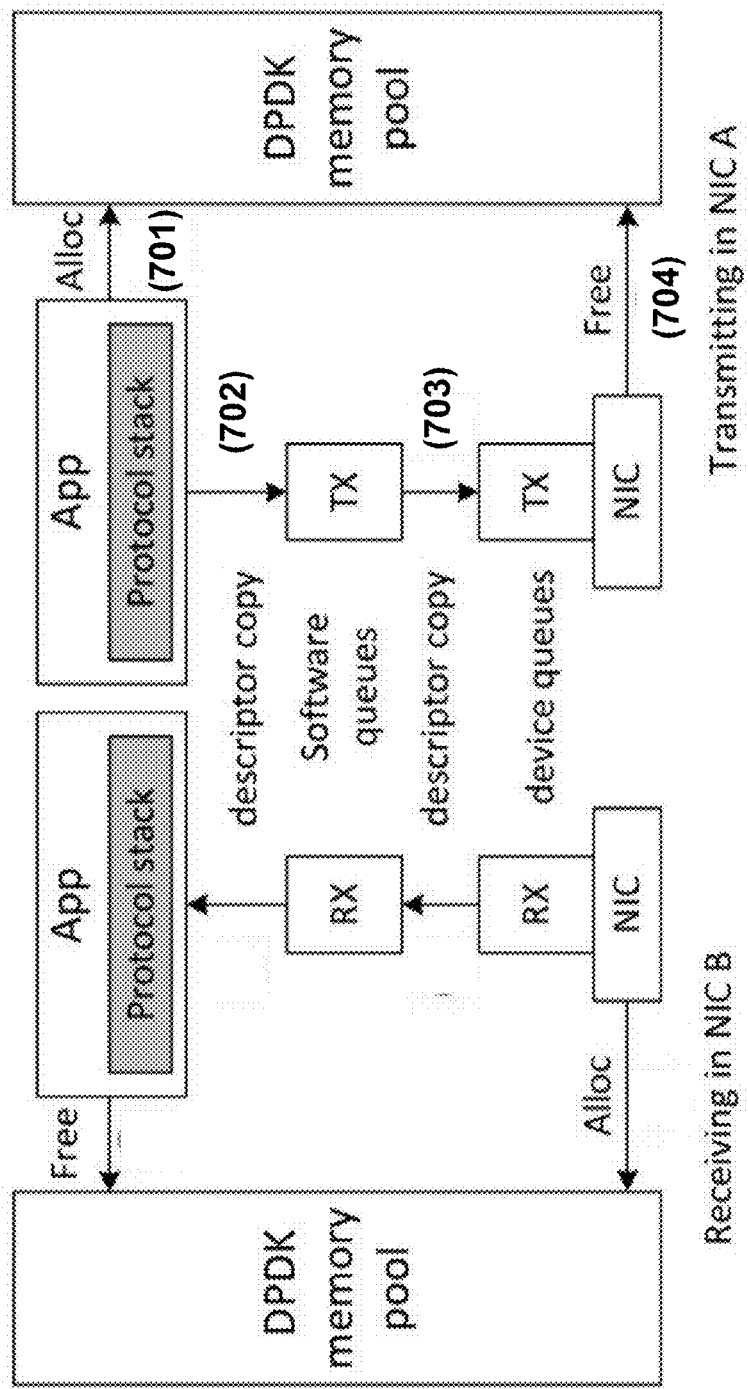
FIG. 7 illustrates workflows of packet I/O in PacketUsher after zero copy is used.

In PacketUsher, we assign one DPDK memory pool to each NIC, and both the packet I/O engine and user applications gain buffers from this memory pool. The general workflow of packet I/O is shown in FIG. 7. When the applications have data to transmit, the protocol stack allocates packet buffers from the shared DPDK memory pool and puts data into these buffers (701). Then packet descriptors are put into the TX queue of DPDK Wrapper (702), and DPDK Wrapper periodically moves packet descriptors from the software queues to Ethernet device queues (703). In order to reduce the per-packet cost, PacketUsher moves a batch of packet descriptors every time. After packets are moved to the network link, the NIC frees these packet buffers (704). In the circumstance of packet receiving, the procedure is similar.

C.3 Parallelism

Packet processing workflows in compute-intensive applications are complicated, and they contain some time-consuming tasks such as flow recognition and keyword censorship. Compared with the underlying packet I/O engine, these workflows process packets slowly. It is easy to observe packet loss on RX queues in the case of high frame rate. In order to improve the performance, packet processing workflows need to be accelerated. There are a variety of strategies useful to remove application-specific performance bottlenecks. In this work, we only discuss the generic strategies to accelerate the packet processing workflows.

We propose to balance the entire workflows across different working threads, which are bound to separate CPU cores (named lcore in DPDK). For CIPP, packet processing workflows consist of three building blocks: protocol stack; flow recognition; and payload processing. Firstly, header and payload information of every packet is extracted in the protocol stack. Then this information is leveraged to find corresponding flows that the packets belong to. Finally, the application-layer payloads are processed by various flow-specific tasks.

Figure 8:
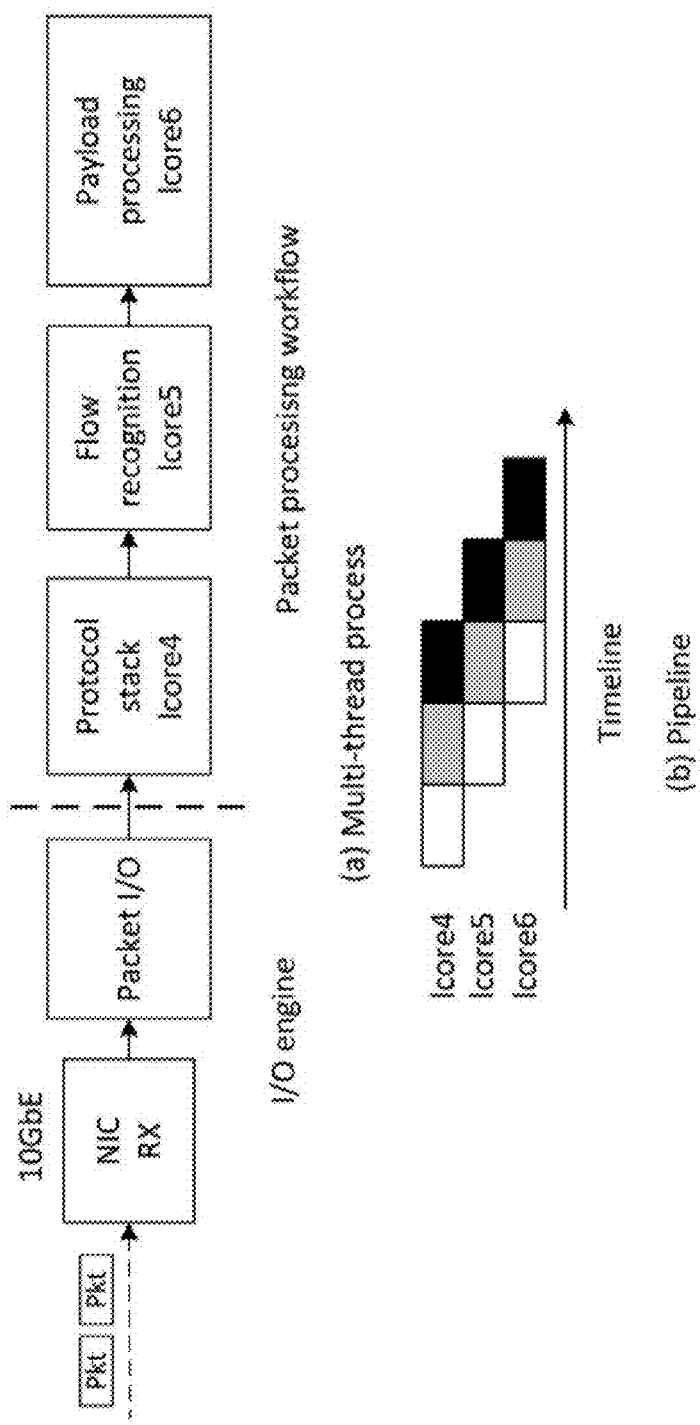
FIG. 8 illustrates: (a) scaling packet processing workflows to three working threads; and (b) utilizing pipeline to realize process acceleration.

In PacketUsher, the above-mentioned packet processing workflow is accomplished by three CPU cores cooperatively as shown on FIG. 8(a). Additionally, we adopt the strategy of pipeline to fully utilize every working CPU core. After lcore4 finishes the task of packet-header and payload analysis, it passes the analysis information to lcore5. Then lcore4 immediately fetches another batch of packets from RX queues to process. The pipeline strategy is also implemented between lcore5 and lcore6 as presented on FIG. 8(b).

D. Case Study

For the evaluation of PacketUsher, we implemented it on a commercial application-layer traffic generator for case study. We used FPS (Flow Per Second) value of the application-layer traffic generator to quantify the performance gain from different stages of PacketUsher. Here we compare PacketUsher with existing methods (Netmap and PF_RING) on the same system.

D.1 Application-Layer Traffic Generator

For testing the performance of application-layer devices or systems, we need realistic and responsive application flows. Application-layer traffic generation is the key technique in the area of network testing. In the industry, an application-layer traffic generator is widely used to test application-layer systems, including web servers, DNS servers, DPI systems, etc. This traffic generator should simulate behavior of a large number of clients to test end systems (web servers, etc.), or simulate interactions between a large number of clients and servers to test middleboxes (application-layer firewalls, IDS, etc.). Every generated application flow consists of a series of ordered actions such as HTTP request and response.

Obviously, the application-layer traffic generator is a typical example of compute-intensive network applications. In this work, we designed and implemented a commercial application-layer traffic generator. The application-layer traffic generator contains a core flow generator, a compiler of flow describing language, a traffic capture and replay subsystem, a protocol database, etc. We depict the architecture of core flow generator on FIG. 9.

Figure 10:
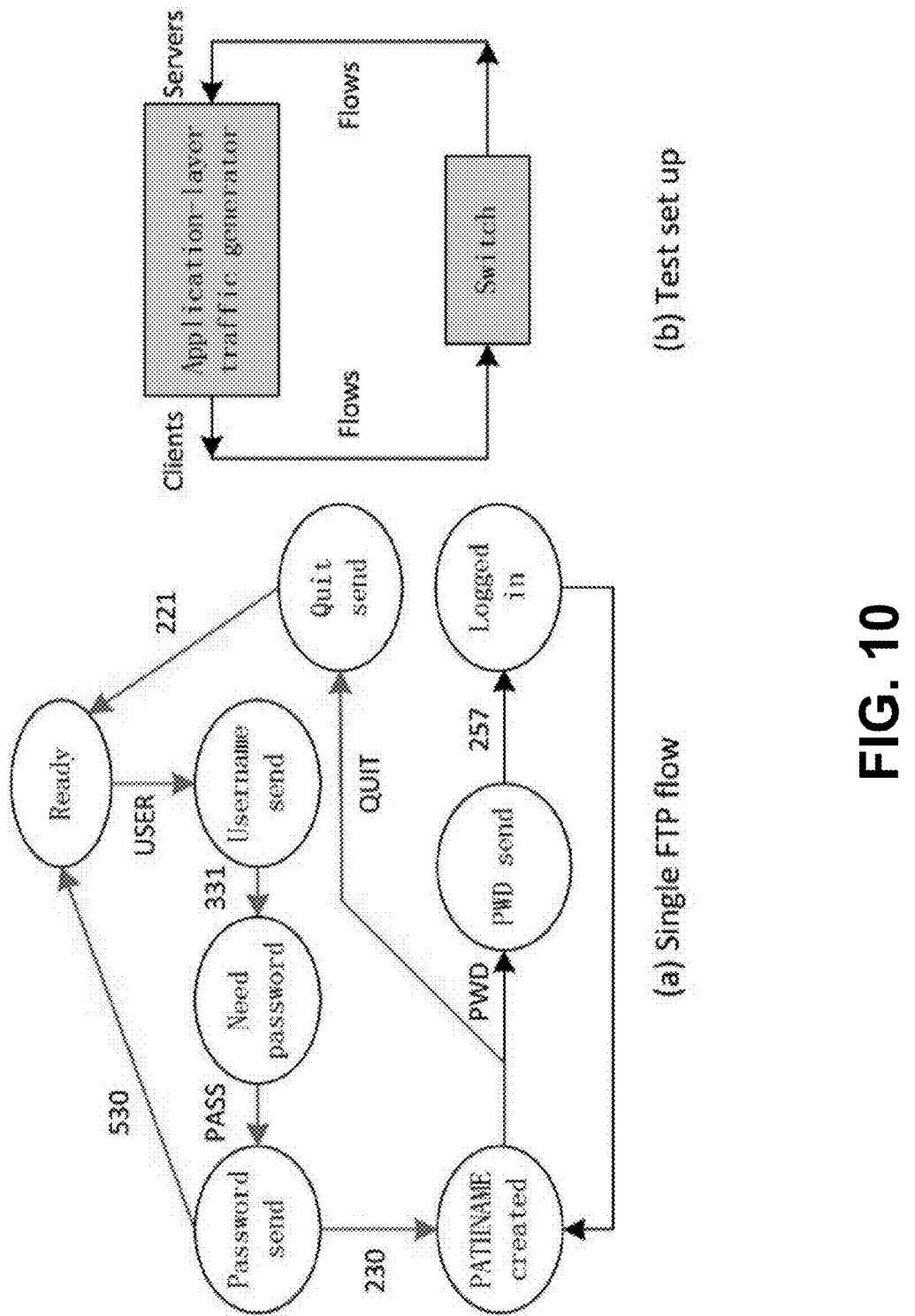
FIG. 10 shows a realization of PacketUsher used as an experiment set-up.

Based on the observation that every network flow consists of a series of ordered actions, we designed one generic language to describe mixture of application flows. End users may configure the ordered actions of every single flow on the User Interface of the application-layer traffic generator. FIG. 10 gives an example of a FTP flow. Additionally, users can define multiple different application flows and make a mixture of them (e.g. 25% FTP, 25% DNS, 25% Web browsing, 25% Instant Messaging).

Figure 9:
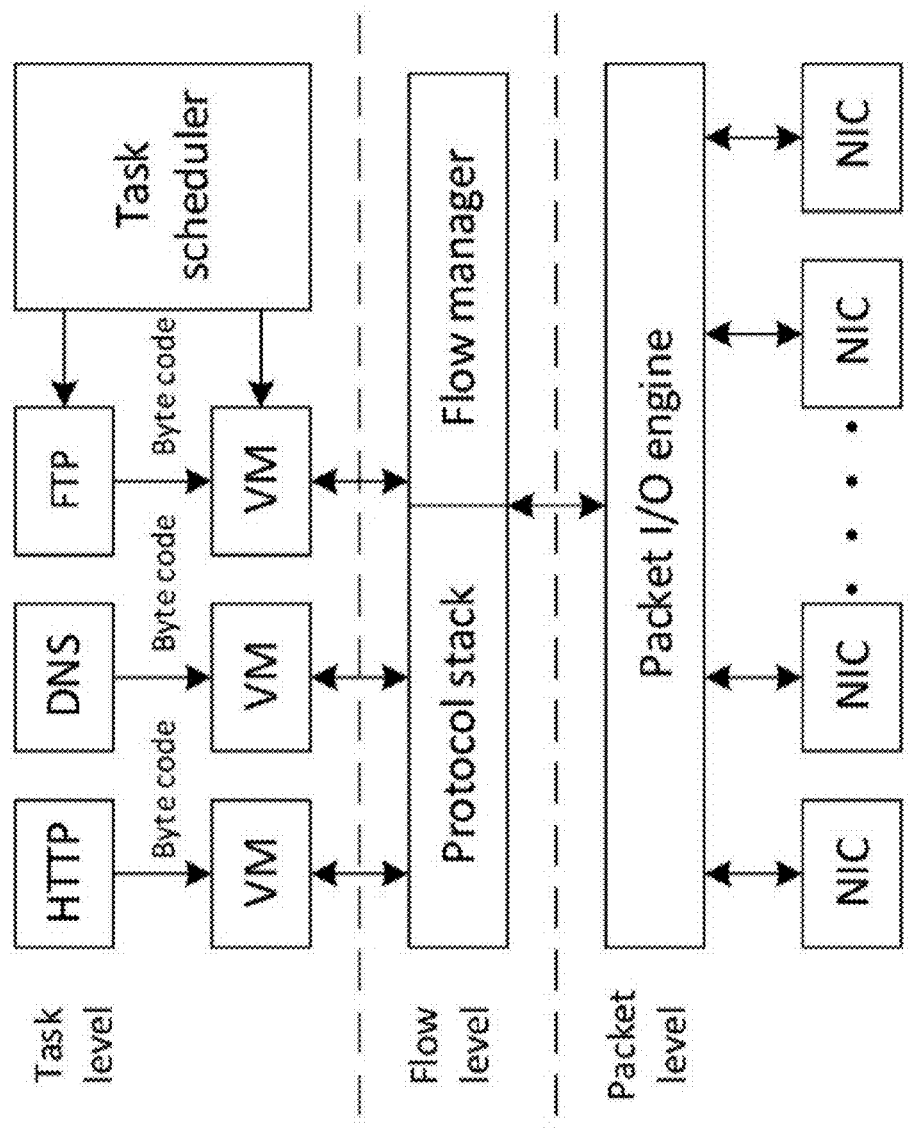
FIG. 9 is, for illustration, a block diagram depicting an architecture of a core flow generator implemented in a commercial application-layer traffic generator.

The system converts the above-mentioned configuration into our defined language and compiles it. Then the task scheduler, as shown in FIG. 9, assigns byte codes of different tasks to corresponding virtual machines (VMs). Every instruction executed in the VMs triggers function calls in a protocol stack to assemble packets. The state and data of every generated flow are stored in the flow manager. Finally, all flow packets are transmitted or received through the packet I/O engine. The application-layer traffic generator has to simulate a large number of flows in every second to test high-performance network devices. The Flow Per Second (FPS) value is critical for the application-layer traffic generator.

D.2 Implementing PacketUsher

A FPS value is the number of flows generated per second by the application-layer traffic generator. It reflects the ability of system to simulate both clients and servers. In our experiments, we used the FPS value to evaluate the performance of our application-layer traffic generator. We configured the system to generate FTP flows, and its state machine is shown on FIG. 10(a). The application-layer traffic generator simulates the behaviors of both clients and servers. To minimize the impact of middlebox on generated flows, the application-layer traffic generator is connected to a switch as shown on FIG. 10(b). In the experiment, the system periodically increased the FPS value until it observed generated failures. Then we decreased the FPS value until it became steady. The system was able to work in this circumstance without packet loss for more than 24 hours.

In order to implement PacketUsher on the application-layer traffic generator, we first replaced the packet I/O APIs of Linux platform with the efficient ones of DPDK Wrapper. Secondly, we implemented zero copy and batch processing in our system. Each physical NIC in our system was assigned with one shared DPDK memory pool. VMs, the protocol stack and DPDK Wrapper all allocated packet buffers from this shared memory pool. Only packet descriptors were copied in function calls. Additionally, the protocol stack fetches a batch of packets from DPDK Wrapper in every function call. Finally, the tasks of packet headers analyzing in the protocol stack, flow recognition in flow manager and flow state updating were handled by three separate CPU cores. The working threads of every virtual machine were bound to unique CPU cores.

D.3 PacketUsher Evaluation

Figure 11:
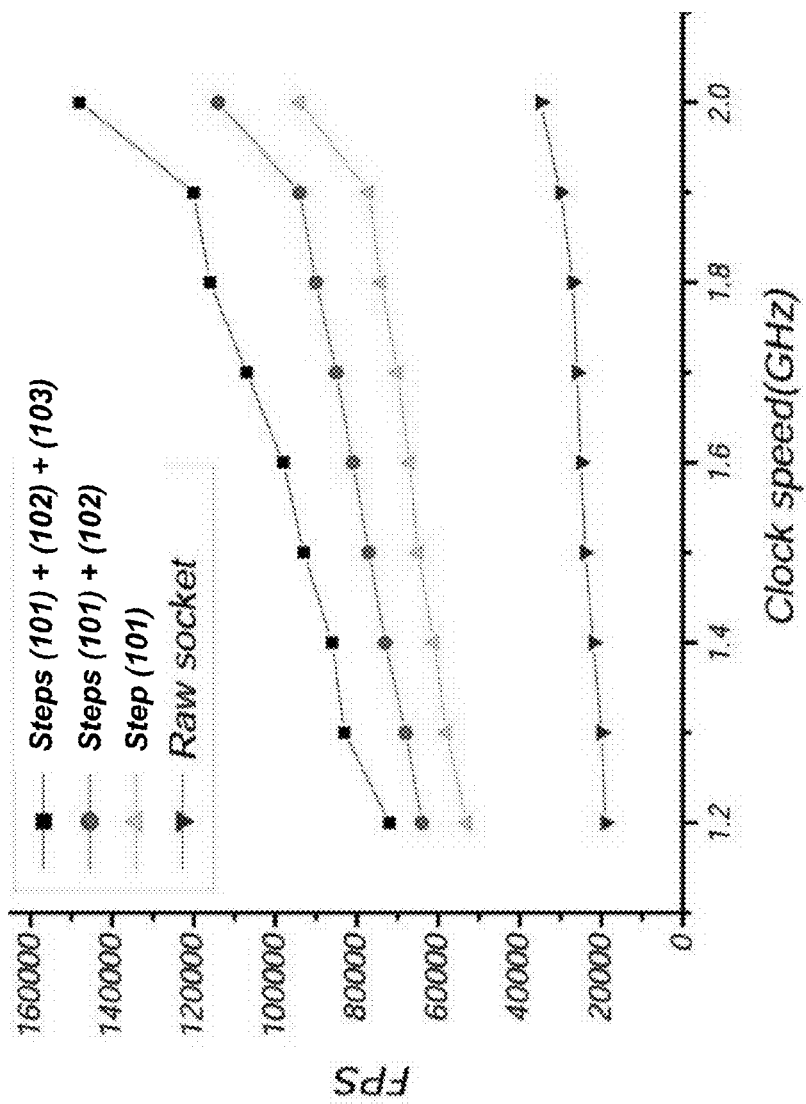
FIG. 11 plots the FPS against the CPU clock speed for different steps of PacketUsher: raw socket; replacing packet I/O mechanism with DPDK Wrapper (101); using zero copy/batch processing (102); and using parallelism (103)

To quantify the performance gain from each stage of PacketUsher, we measured the FPS values of the application-layer traffic generator on different acceleration stages. FIG. 11 depicts the experiment results for various CPU speeds. The original performance over a standard raw packet I/O API of the Linux platform is disappointed, and the FPS value of the application-layer traffic generator is only 35,000 at a CPU speed of 2.0 GHz. It is noticeable that PacketUsher significantly increases the FPS values at all CPU speeds. When replacing the standard I/O mechanism of Linux with our DPDK Wrapper, the FPS value reaches 94,000 at a CPU speed of 2.0 GHz. After implementing zero copy and batch processing on the system, we successfully achieved a FPS value of 114,000 at a CPU speed of 2.0 GHz. Finally, we gained encouraging performance improvement after totally adopting the scheme of PacketUsher. The FPS value reaches 148,000 at CPU speed 2.0 GHz, which is more than 4 times of the original value. Our experimental results show that PacketUsher can significantly improve the performance of the application-layer traffic generator.

Figure 12:
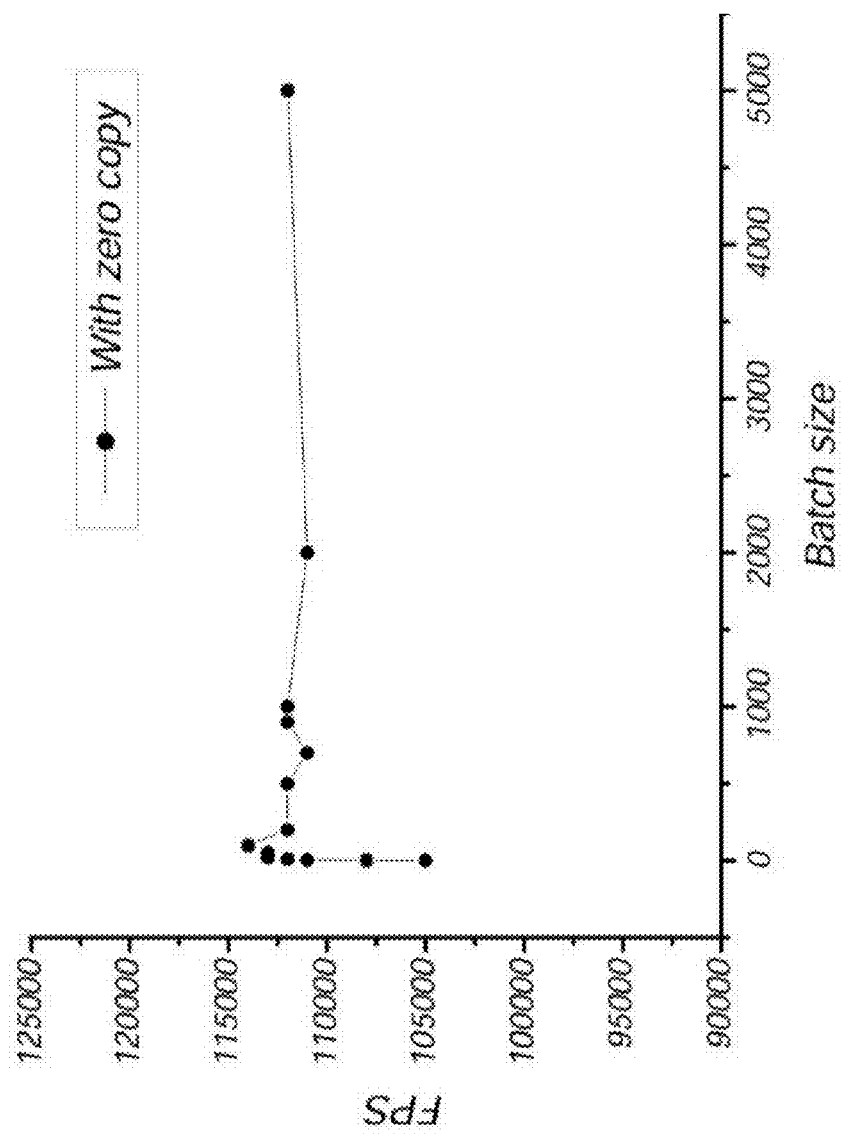
FIG. 12 plots the FPS against the batch size of packets after DPDK Wrapper and zero copy are used.

As the application-layer traffic generator is compute-intensive, the CPU speed has significant impact on its performance. From FIG. 11, we can see that the FPS values increase almost linearly as the CPU speed increases. The batch size of pre-fetched packets from the RX queues has influence on FPS values as well. In FIG. 12, we plot the FPS values for different batch sizes. The experimental results show that a larger batch size can noticeably improve the performance at an early stage. However, it has nearly no influence on the performance if we further increase the batch size. In such case, the performance is restricted by the slow processing speed of high-level workflows. We would accelerate it using parallelism in PacketUsher. The optimal value of the batch size for one RX queue is 100, and the FPS value is 105,000 at a CPU speed of 2.0 GHz.

D.4 Comparison with Existing Solutions

Previous research [12] claims that replacing the underlying packet I/O mechanism of Linux platform with Netmap could encouragingly accelerate Open vSwitch [15] and Click [16] on a commodity PC. By comparison, we implemented the packet I/O frameworks of PF_RING and Netmap on the application-layer traffic generator as well. PF_RING is a novel packet I/O framework that utilizes buffer rings in kernel space and polling to speed up packet I/O. It mainly improves the performance of packet receiving on the commodity PC. Netmap accelerates the procedure of packet I/O mainly through a light-weight metadata representation, pre-allocated packet buffers, direct and protected packet buffer access.

Figure 13:
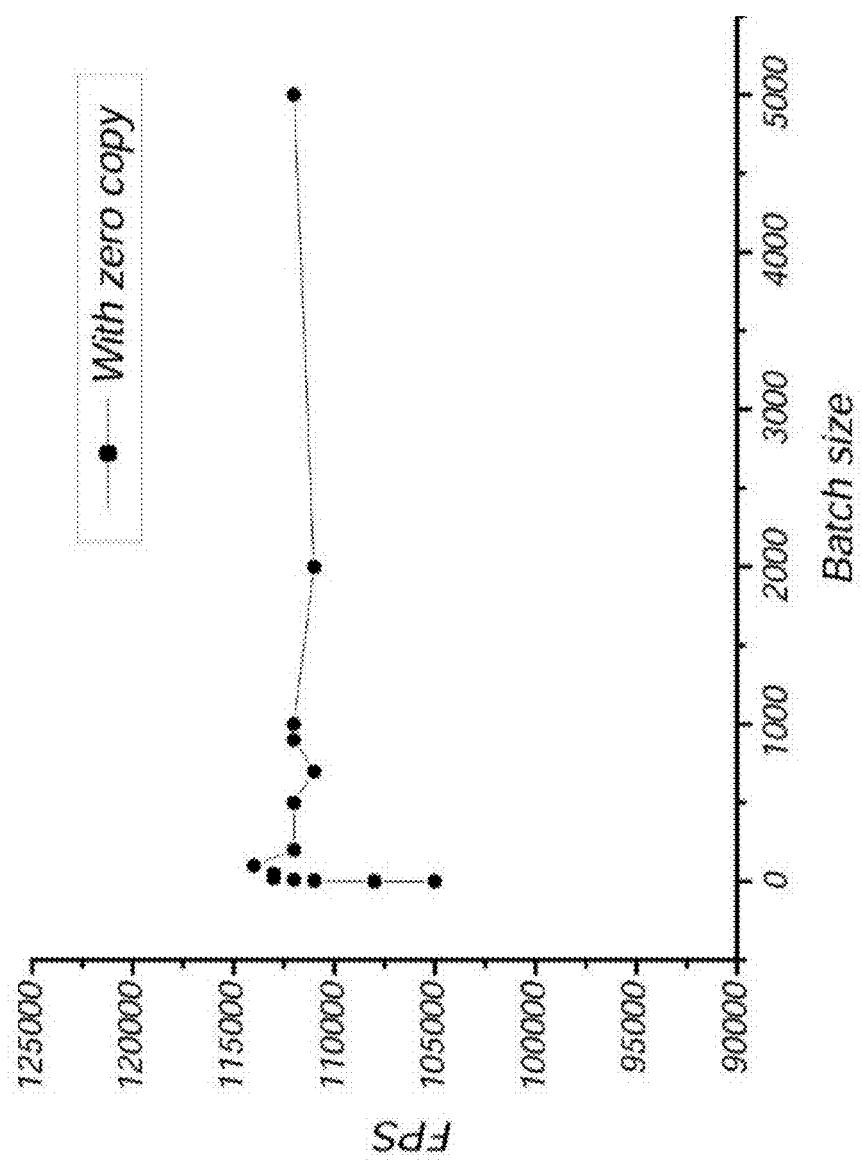
FIG. 13 plots the FPS against the CPU clock speed for different improvement solutions: the disclosed PacketUsher; Netmap; PF_RING; and the original raw socket.

We measured the FPS values of our application-layer traffic generator over four different types of packet I/O frameworks. The results are plotted on FIG. 13. The experimental results show that our system over PF_RING achieves a FPS value of 46,000 at a CPU speed of 2.0 GHz. The performance of our system over Netmap is better than that over PF_RING. It could generate 52,000 flows per second at a CPU speed of 2.0 GHz. From FIG. 13, it is observed that both PF_RING and Netmap could not improve the performance significantly. On the same platform, PacketUsher improves the performance of our application-layer traffic generator substantially, and the FPS value is 148,000, which is more than 4 times of that over a raw socket. Additionally, the performance of our system over PacketUsher is about 3 times of that over Netmap and PF_RING. All the aforementioned experimental results show that PacketUsher could noticeably accelerate CIPP.

E. The Present Invention

With a goal of accelerating CIPP, an aspect of the present invention is to provide a method for performing CIPP in a computer system comprising a programmable computing platform and one or more NICs. The computer system may be a computer or a group of interconnected computers. The platform has a plurality of resources and is used for performing packet I/O functions for plural threads generated by a plurality of user applications. The one or more NICs are for transmitting and receiving packets.

Figure 14:
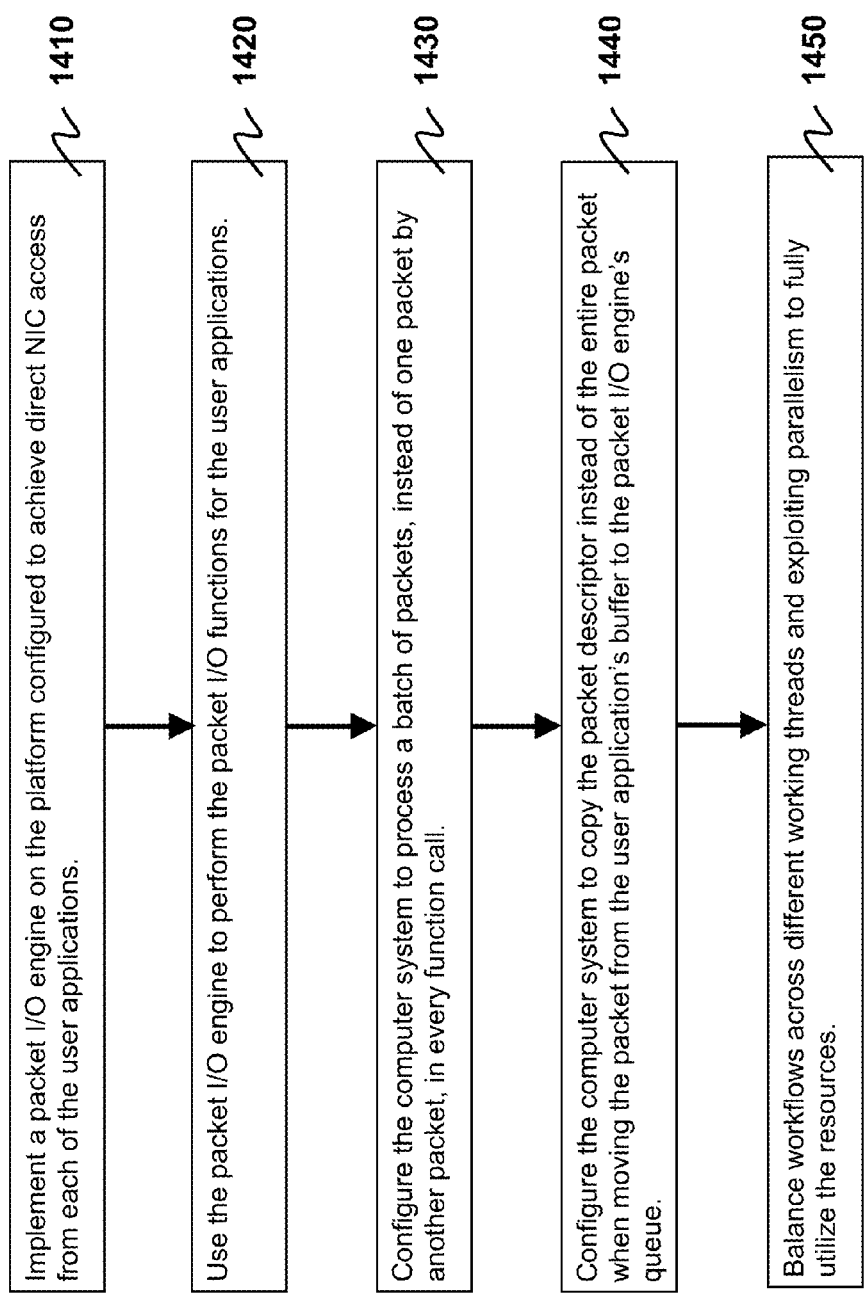
FIG. 14 depicts, in accordance with an exemplary embodiment of the present invention, a flowchart of a method for performing CIPP in a computer system comprising a programmable computing platform and one or more NICs.

The method is developed according to DPDK Wrapper and PacketUsher detailed in Sections B and C, respectively. FIG. 14 depicts, in accordance with an exemplary embodiment of the present invention, a flowchart for illustrating the disclosed method. In the method, a packet I/O engine is implemented on the platform for performing the packet I/O functions, where the packet I/O engine is configured to achieve direct NIC access from each of the user applications (step 1410). One embodiment of the packet I/O engine is DPDK Wrapper. The packet I/O engine is used to perform the packet I/O functions for the user applications (step 1420).

To achieve a higher performance in CIPP, the computer system is preferably configured to process a batch of packets, instead of one packet by another packet, in every function call (step 1430). It is also preferable to configure the computer system to, when moving a first packet between a buffer of an individual user application and a queue of the packet I/O engine, copy a packet descriptor of the first packet instead of an entirety of the first packet (step 1440). Yet an additional means to further improve the CIPP performance is to balance workflows across different working threads and exploiting parallelism to fully utilize the resources of the platform (step 1450).

Figure 15:
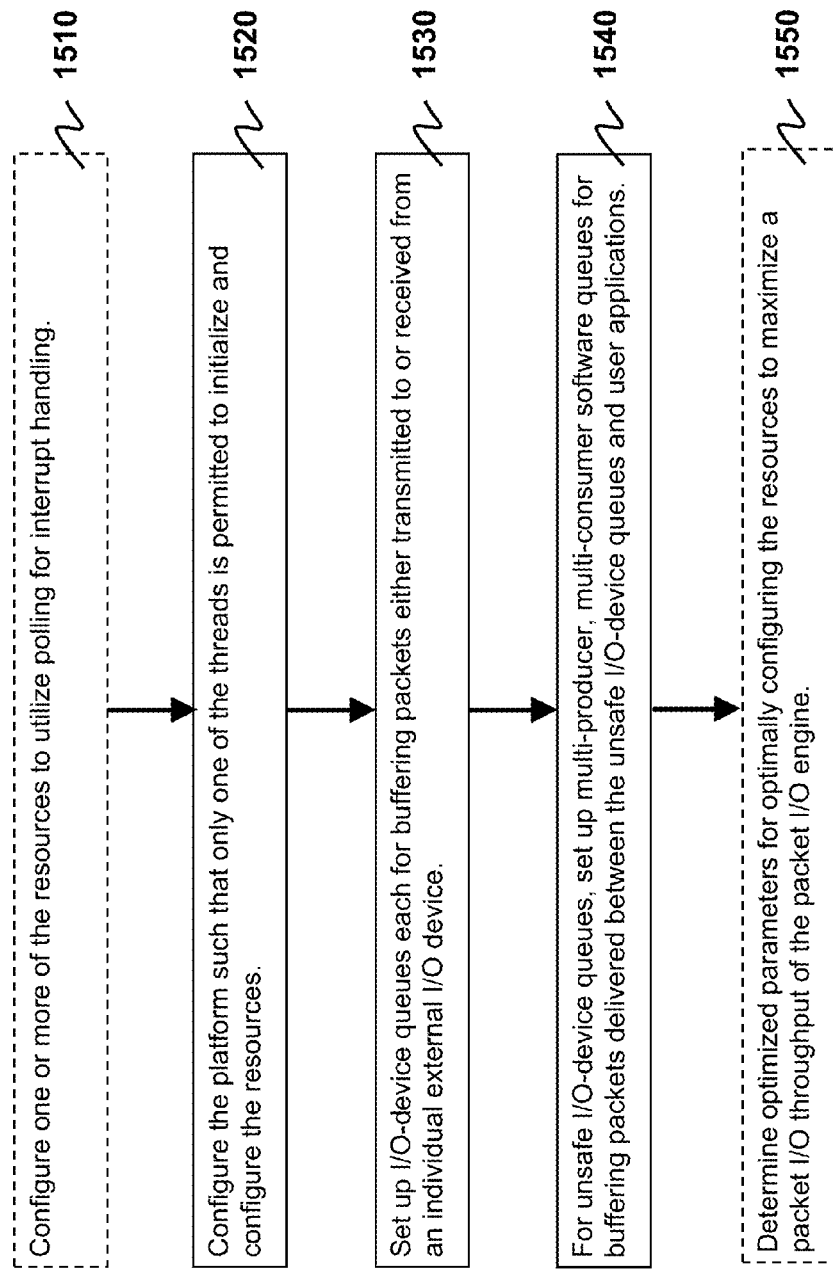
FIG. 15 is a flowchart for illustrating implementation of a packet I/O engine on the programmable computing platform according to one embodiment of the present invention.

In one embodiment, the packet I/O engine is implemented on the platform through the following approach. FIG. 15 is a flowchart depicting this approach. The platform is configured such that only one of the threads is permitted to initialize and configure the resources (step 1520). Furthermore, I/O-device queues each for buffering packets either transmitted to or received from an individual external I/O device are set up in the platform (step 1530). One example of the I/O-device queue is an Ethernet device queue as mentioned in Section B, and an example of the external I/O device is a NIC. One key step in implementing the packet I/O engine is that for a plurality of unsafe I/O-device queues among the I/O-device queues and determined to be multi-thread unsafe, a plurality of multi-producer, multi-consumer software queues is set up for buffering packets delivered between the plurality of the unsafe I/O-device queues and the plurality of user applications (step 1540). In particular, the plurality of multi-producer, multi-consumer software queues is configured such that the unsafe I/O-device queues are collectively synchronized to maintain data consistency in packet delivery when the plural threads are present. Note that the I/O-device queues and the multi-producer, multi-consumer software queues are implemented on one or more of the resources in the platform.

During initialization of the platform, the platform may be configured such that one or more of the resources may utilize polling for interrupt handling (step 1510).

Furthermore, optimized parameters may be determined for optimally configuring the resources to maximize a packet I/O throughput of the packet I/O engine (step 1550). The optimized parameters to be determined may consist only of a cache option in a memory pool, and a packet batch size. Alternatively, the optimized parameters may include one or more of the following: a cache option in a memory pool; a packet batch size; a queue size of each of the I/O-device queues; a size of the memory pool; and transmit/receive Prefetch, Host, Write-back threshold values.

Advantageously and preferably, the packet I/O engine is implemented as DPDK Wrapper.

In one embodiment, the computer system is a Linux-based computer system, and is configured to bypass standard I/O mechanisms of Linux and to only use the packet I/O engine in performing the I/O functions.

Figure 16:
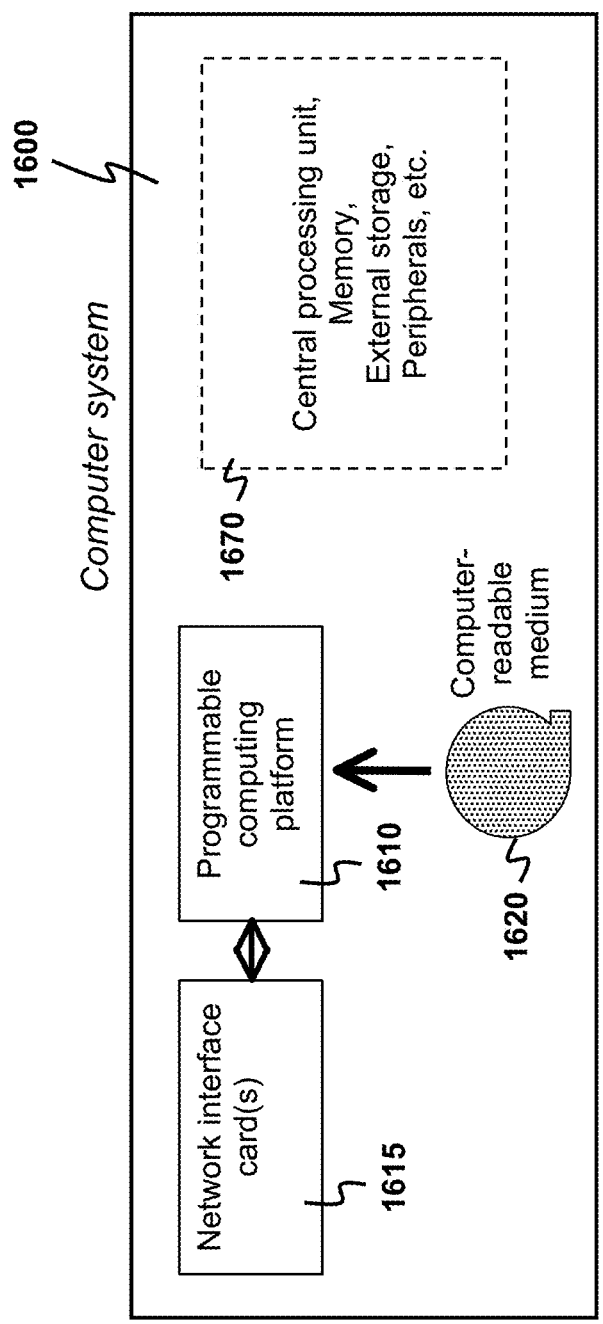
FIG. 16 is a block-diagram schematic showing an example of a computer system implementable with an embodiment of the disclosed method for performing CIPP.

Any embodiment of the disclosed method is implementable to the computer system as illustrated in an example depicted in FIG. 16. A computer system 1600 shown in FIG. 16 comprises: a programmable computing platform 1610, one or more NICs 1615 communicable to the platform 1610; and other parts 1670 of the computer system 1600, such as a central processing unit, a memory, an external storage and peripherals. The computer system 1600 further comprises a non-transitory computer-readable medium 1620. Contents of the medium 1620, when executed on the computer system 1600, cause the computer system 1600 to execute a process for performing CIPP. The process is arranged according to one of the embodiments of the method as disclosed above.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for performing compute-intensive packet processing (CIPP) in a computer system comprising a programmable computing platform and one or more network interface cards (NICs), the platform having a plurality of resources and being used for performing packet input/output (I/O) functions for plural threads generated by a plurality of user applications, the one or more NICs being used for transmitting and receiving packets, the method comprising:
   implementing a packet I/O engine on the platform for performing the packet I/O functions, wherein the packet I/O engine is configured to achieve direct NIC access from each of the user applications;
   using the packet I/O engine to perform the packet I/O functions for the user applications; and
   configuring the computer system to, when moving a first packet between a buffer of an individual user application and a queue of the packet I/O engine, implement zero copy to reduce memory copy overheads by copying a packet descriptor of the first packet instead of an entirety of the first packet.

2. The method of claim 1, further comprising:
   configuring the computer system to process a batch of packets, instead of one packet by another packet, in every function call.

3. The method of claim 1, further comprising:
   balancing workflows across different working threads and exploiting parallelism to fully utilize the resources.

4. The method of claim 1, further comprising:
   configuring the computer system to process a batch of packets, instead of one packet by another packet, in every function call;
   and
   balancing workflows across different working threads and exploiting parallelism to fully utilize the resources.

5. The method of claim 1, wherein the implementing of the packet I/O engine comprises:
   configuring the resources to utilize polling for reducing overheads of interrupt handling;
   configuring the platform such that only one of the threads is permitted to initialize and configure the resources;
   setting up, on the platform, I/O-device queues each for buffering packets either transmitted to or received from an individual external I/O device; and
   for a plurality of unsafe I/O-device queues determined to be multi-thread unsafe among the I/O-device queues, setting up, on the platform, a plurality of multi-producer, multi-consumer software queues for buffering packets delivered between the plurality of the unsafe I/O-device queues and the plurality of user applications, wherein the plurality of multi-producer, multi-consumer software queues is configured such that the unsafe I/O-device queues are collectively synchronized to maintain data consistency in packet delivery when the plural threads are present.

6. The method of claim 5, wherein the implementing of the packet I/O engine further comprises:
   determining optimized parameters for configuring the resources to maximize a packet I/O throughput of the packet I/O engine.

7. The method of claim 6, wherein the optimized parameters consist of a cache option in a memory pool, and a packet batch size.

8. The method of claim 1, wherein the computer system is a Linux-based computer system, and the method further comprises:
   configuring the computer system to bypass standard I/O mechanisms of Linux and to only use the packet I/O engine in performing the I/O functions.

9. The method of claim 1, wherein the platform is Intel Data Plane Development Kit (DPDK), and the packet I/O engine is a DPDK Wrapper.

10. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 1.

11. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 2.

12. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 3.

13. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 4.

14. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 5.

15. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 6.

16. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 7.

17. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 8.

18. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 9.

19. The method of claim 9, wherein the DPDK Wrapper is the packet I/O engine configured to have only one thread for initializing and configuring the resources.

20. A non-transitory computer-readable medium whose contents, when executed by a computer system comprising a programmable computing platform and one or more network interface cards (NICs), cause the computer system to execute a process for performing compute-intensive packet processing (CIPP), the platform having a plurality of resources and being used for performing packet input/output (I/O) functions for plural threads generated by a plurality of user applications, the one or more NICs being used for transmitting and receiving packets, wherein the process is arranged according to the method of claim 19.

* * * * *